(12) United States Patent
Wan et al.

(10) Patent No.: US 12,233,930 B1
(45) Date of Patent: Feb. 25, 2025

(54) BEACH CART

(71) Applicant: Ningbo Bonsing Outdoor Products Co., Ltd., Zhejiang (CN)

(72) Inventors: Yinxia Wan, Zhejiang (CN); Kaiyong Jia, Zhejiang (CN)

( * ) Notice: Subject to any disclaimer, the term of this patent is extended or adjusted under 35 U.S.C. 154(b) by 0 days.

(21) Appl. No.: 18/814,418

(22) Filed: Aug. 23, 2024

(30) Foreign Application Priority Data

Aug. 7, 2024 (CN) .......................... 202411080129.8

(51) Int. Cl.
*B62B 5/06* (2006.01)
*B62B 1/00* (2006.01)

(52) U.S. Cl.
CPC .............. *B62B 5/067* (2013.01); *B62B 1/008* (2013.01); *B62B 2202/52* (2013.01)

(58) Field of Classification Search
CPC ...... B62B 5/067; B62B 1/008; B62B 2202/52
See application file for complete search history.

(56) References Cited

U.S. PATENT DOCUMENTS

| | | | | |
|---|---|---|---|---|
| 1,996,865 A * | 4/1935 | Haag | .......................... | E05C 9/06 292/335 |
| 3,308,579 A * | 3/1967 | Thams | ..................... | E05D 15/52 49/192 |
| 3,998,476 A * | 12/1976 | Kazmark, Sr. | .......... | B62B 1/125 280/655 |
| 5,245,846 A * | 9/1993 | James | .................. | E05B 65/0078 109/59 R |
| 5,826,922 A * | 10/1998 | Wernig | .................... | E05C 9/041 292/172 |
| 6,705,136 B2 * | 3/2004 | Porter | ................ | G07C 9/00182 70/279.1 |
| 8,357,278 B2 * | 1/2013 | Latham | .................. | B01D 57/02 204/464 |
| 11,738,787 B1 * | 8/2023 | Lindsey | .................... | B62B 1/12 280/30 |
| 2005/0161916 A1 * | 7/2005 | Taylor | ..................... | B62B 1/125 280/655.1 |
| 2022/0369781 A1 * | 11/2022 | Brunner | ................... | A45C 5/14 |

* cited by examiner

Primary Examiner — Bryan A Evans

(57) ABSTRACT

A beach cart comprises a cart body, wherein the cart body comprises a push rod and a load-bearing rod; both ends of the push rod are movably sleeved with a main body support tube; a cross bar is provided between the two main body support tubes, and an inside of the cross bar is provided with a locking mechanism for adjusting the height of the push rod and locking; the locking mechanism comprises two transmission handles and a gear for driving the two transmission handles to move relative to each other or in opposite directions. The foldable support frame facilitates the user to adjust the posture of the load-bearing rod and makes loading more convenient; the cart body can also be used with the luggage to increase the carrying space and meet the user's needs.

9 Claims, 5 Drawing Sheets

BEACH CART

TECHNICAL FIELD

The invention relates to the technical field of beach tools, in particular to a beach cart.

BACKGROUND ART

The main function of a beach cart is to facilitate carrying and transporting items. The design of a beach cart is to help users easily carry items in environments such as beaches. Its features include strong load-bearing capacity, easy operation and portability. Specifically, the role of a beach cart is reflected in the following aspects: 1. strong load-bearing capacity: it can withstand a certain weight, which is very useful for carrying sand tools, children's toys, picnic supplies, etc. on the beach; 2. easy operation: the design of the beach cart makes it simple to carry items, even in the face of complex beach terrain; 3. portability: beach carts are usually designed to be foldable, which is easy to store and carry, and convenient for users to use in different occasions. However, the existing beach carts still have the following shortcomings when used:

The bottom of the front of the existing beach cart usually adopts a fixed bracket. Although it can stably support the front of the cart, the height of the front of the cart cannot be lowered, which is not conducive to loading. In addition, the push rod part of the existing beach cart adopts a locking method on both sides to adjust, which makes the operation process cumbersome and slow, and the use effect is not ideal.

SUMMARY OF THE INVENTION

In order to achieve the above purpose, the invention provides the following technical solutions: a beach cart, comprising a cart body, wherein the cart body comprises a push rod and a load-bearing rod; both ends of the push rod are movably sleeved with a main body support tube; a cross bar is provided between the two main body support tubes, and an inside of the cross bar is provided with a locking mechanism for adjusting the height of the push rod and locking; the locking mechanism comprises two transmission handles and a gear for driving the two transmission handles to move relative to each other or in opposite directions;

tops of both ends of the load-bearing rod are respectively connected to bottoms of the two main body support tubes; a driving rod is provided at both ends of the load-bearing rod, and both ends of the driving rod are provided with a beach wheel; a bottom of one end of the load-bearing rod away from the driving rod is provided with a support frame.

Preferably, the push rod is U-shaped, and both sides of an inner wall of the push rod are provided with a plurality of locking holes; an inside of the beach wheel is provided with a wheel hub for connecting to the driving rod.

Preferably, insides of both transmission handles are provided with a movable hole sleeved with the gear; the two movable holes are opposite to each other, and insides of the two movable holes are respectively provided with a first gear rack and a second gear rack staggered from each other.

Preferably, the first gear rack and the second gear rack are respectively meshed with a bottom and top of the gear; one end of the transmission handle away from the movable hole is provided with a stabilizing plate, and one side of the stabilizing plate away from the transmission handle is provided with an inserting rod; one end of the inserting rod away from the stabilizing plate is movably inserted into an interior of one of the locking holes, and one side of the stabilizing plate away from the inserting rod is provided with a support rib.

Preferably, both sides of the cross bar are provided with assembly holes; one end of the gear is provided with a positioning shaft movably sleeved with one of the assembly holes, and the other end thereof passes through the other assembly hole and is provided with a locking handle.

Preferably, both ends of the support frame are fixedly provided with L-shaped positioning joints; one end of the positioning joint away from the support frame is movably hinged to the load-bearing rod, and both sides of the positioning joint are provided with a plurality of connecting ribs.

Preferably, both ends of the load-bearing rod are fixedly connected to the driving rod via a T-shaped first connecting piece, and the load-bearing rod is U-shaped; both ends of one side of the load-bearing rod away from the driving rod are provided with triangular reinforcing support pieces; a top of the reinforcing support piece is provided with a triangular support platform.

Preferably, both ends of the cross bar are respectively connected to the two main body support tubes via a T-shaped second connecting piece.

Preferably, a bottom of the main body support tube is connected to the load-bearing rod via a triangular third connecting piece; an inclined surface on one side of the third connecting piece is provided with a mounting groove, and an inside of the mounting groove is provided with a reinforcing rib.

Preferably, an inside of the load-bearing rod is provided with a connecting rod; a plurality of reinforcing rods are further provided between an inside of the load-bearing rod and the connecting rod, and both ends of the reinforcing rod are respectively connected to the load-bearing rod and the connecting rod via fourth connecting pieces;

one end of the fourth connecting piece away from the reinforcing rod is provided with a first L-shaped connecting piece, and both ends of the reinforcing rod are respectively connected to the load-bearing rod and the connecting rod via first L-shaped connecting pieces;

both ends of the connecting rod are connected to the load-bearing rod via a fifth connecting piece; one end of the fifth connecting piece away from the connecting rod is provided with a second L-shaped connecting piece, and one end of the second L-shaped connecting piece away from the fifth connecting piece is connected to the load-bearing rod.

Compared with the prior art, the invention provides a beach cart with the following beneficial effects.

The beach cart can unlock and lock the push rod by turning the locking handle, making the adjustment process of the push rod simpler and faster; the foldable support frame facilitates the user to adjust the posture of the load-bearing rod and makes loading more convenient; the cart body can also be used with the luggage to increase the carrying space and meet the user's needs.

BRIEF DESCRIPTION OF ACCOMPANY DRAWINGS

One or more embodiments are exemplarily described by corresponding drawings, which do not limit the embodiments. Elements with the same reference numerals in the drawings are shown as similar elements, and the drawings do not constitute a scale limitation, and wherein.

Figure 1:
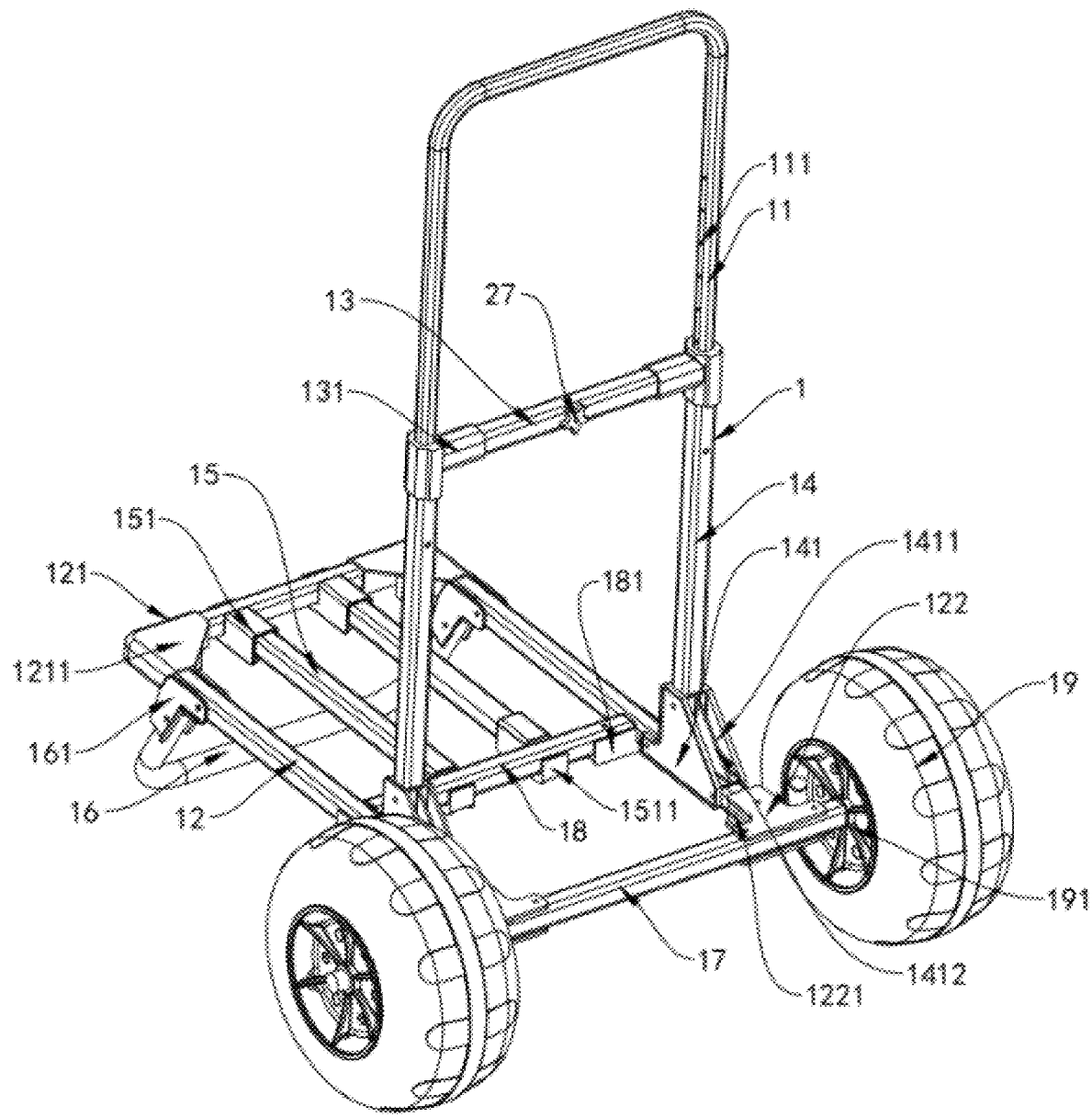
FIG. 1 is a schematic structural diagram of the beach cart according to the invention.
Figure 2:
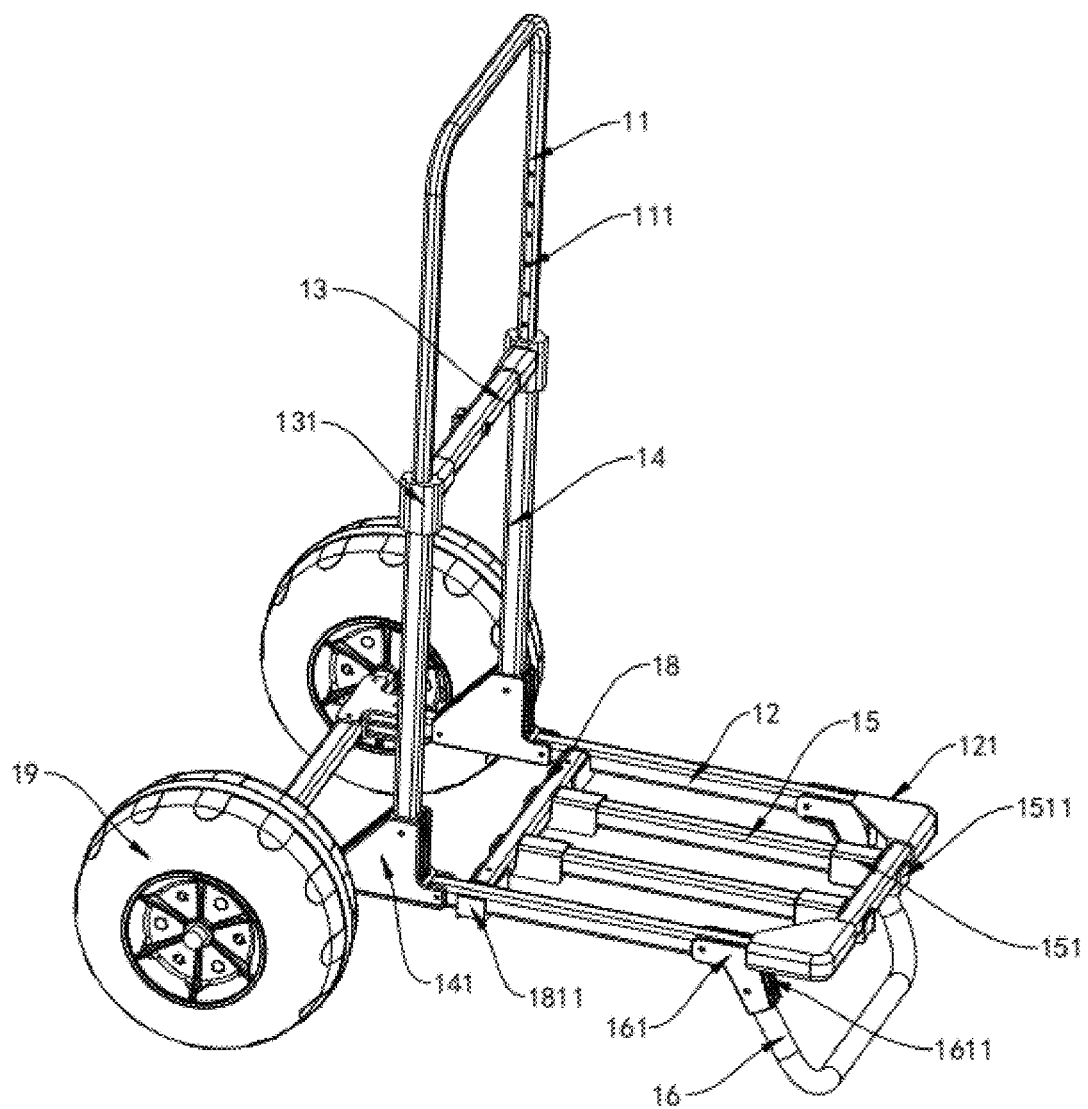
FIG. 2 is a structural side view of the beach cart according to the invention.

In the figures: 1 refers to the cart body; 11 refers to the push rod; 111 refers to the locking hole; 12 refers to the load-bearing rod; 121 refers to the reinforcing support piece; 1211 refers to the support platform; 13 refers to the cross bar; 131 refers to the second connecting piece; 132 refers to the assembly hole; 14 refers to the main body support tube; 141 refers to the third connecting piece; 1411 refers to the mounting groove; 1412 refers to the reinforcing rib; 15 refers to the reinforcing rod; 151 refers to the fourth connecting piece; 1511 refers to the first L-shaped connecting piece; 16 refers to the support frame; 161 refers to the positioning joint; 1611 refers to the connecting rib; 17 refers to the driving rod; 18 refers to the connecting rod; 181 refers to the fifth connecting piece; 1811 refers to the second L-shaped connecting piece; 19 refers to the beach wheel; 191 refers to the wheel hub; 2 refers to the locking mechanism; 21 refers to the transmission handle; 211 refers to the stabilizing plate; 212 refers to the support rib; 22 refers to the movable hole; 23 refers to the gear; 24 refers to the first gear rack; 25 refers to the second gear rack; 26 refers to the positioning shaft; 27 refers to the locking handle; 28 refers to the inserting rod; 3 refers to the luggage; 31 refers to the clamping plate.

SPECIFIC EMBODIMENT OF THE INVENTION

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in various different configurations.

The terms "first", "second", etc. in the specification and claims of the embodiments of the invention and the above drawings are used to distinguish similar objects, and are not necessarily used to describe a specific order or sequence. It should be understood that the terms used in this way can be interchanged where appropriate. In addition, the terms "including" and "comprising" and any variations thereof are intended to cover non-exclusive inclusions.

In the description of the invention, it needs to be understood that the orientation or positional relationship indicated by the terms "center", "up", "down", "left", "right", "vertical", "horizontal", "inner", "outer", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention.

In the invention, unless otherwise clearly defined and limited, the terms "provided", "installed", "connected" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

In the description of the invention, "plurality" means at least two.

It should be noted that, in the absence of conflict, the embodiments and features in the embodiments of the invention may be combined with each other.

Embodiment 1: with reference to FIGS. 1-4, a beach cart, comprising a cart body 1, wherein the cart body 1 comprises a push rod 11 and a load-bearing rod 12; both ends of the push rod 11 are movably sleeved with a main body support tube 14; a cross bar 13 is provided between the two main body support tubes 14, and an inside of the cross bar 13 is provided with a locking mechanism 2 for adjusting the height of the push rod 11 and locking; the locking mechanism 2 comprises two transmission handles 21 and a gear 23 for driving the two transmission handles 21 to move relative to each other or in opposite directions; tops of both ends of the load-bearing rod 12 are respectively connected to bottoms of the two main body support tubes 14; a driving rod 17 is provided at both ends of the load-bearing rod 12, and both ends of the driving rod 17 are provided with a beach wheel 19; a bottom of one end of the load-bearing rod 12 away from the driving rod 17 is provided with a support frame 16. The push rod 11 can be unlocked and locked by turning the locking handle 27, making the adjustment process of the push rod 11 simpler and faster. The foldable support frame 16 facilitates the user to adjust the posture of the load-bearing rod 12, making loading more convenient, and the cart body 1 can also be used in conjunction with the luggage 3 to increase the carrying space and meet user needs.

Specifically, the push rod 11 is U-shaped, and both sides of an inner wall of the push rod 11 are provided with a plurality of locking holes 111; an inside of the beach wheel 19 is provided with a wheel hub 191 for connecting to the driving rod 17.

In the embodiment, the number of locking holes 111 is set according to the adjustable height of the push rod 11. The U-shaped push rod 11 has an integrated design and higher stability. The wheel hub 191 is used to support the beach wheel 19, and the wheel hub 191 and the driving rod 17 are movably connected through a bearing, so that the beach wheel 19 rotates more smoothly.

Specifically, insides of both transmission handles 21 are provided with a movable hole 22 sleeved with the gear 23; the two movable holes 22 are opposite to each other, and insides of the two movable holes 22 are respectively provided with a first gear rack 24 and a second gear rack 25 staggered from each other.

Figure 3:
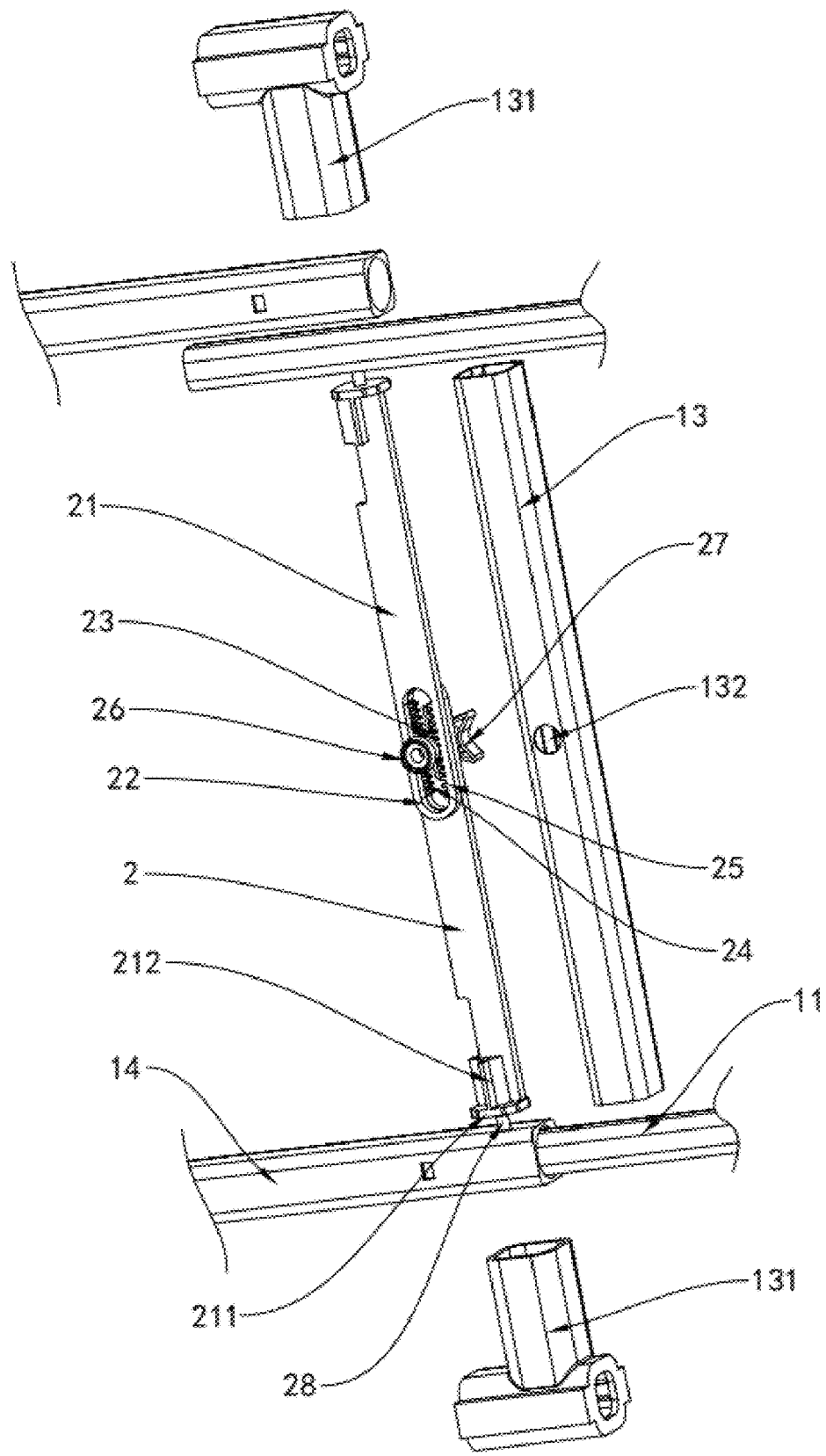
FIG. 3 is a schematic structural diagram of the locking mechanism in the beach cart according to the invention.
Figure 4:
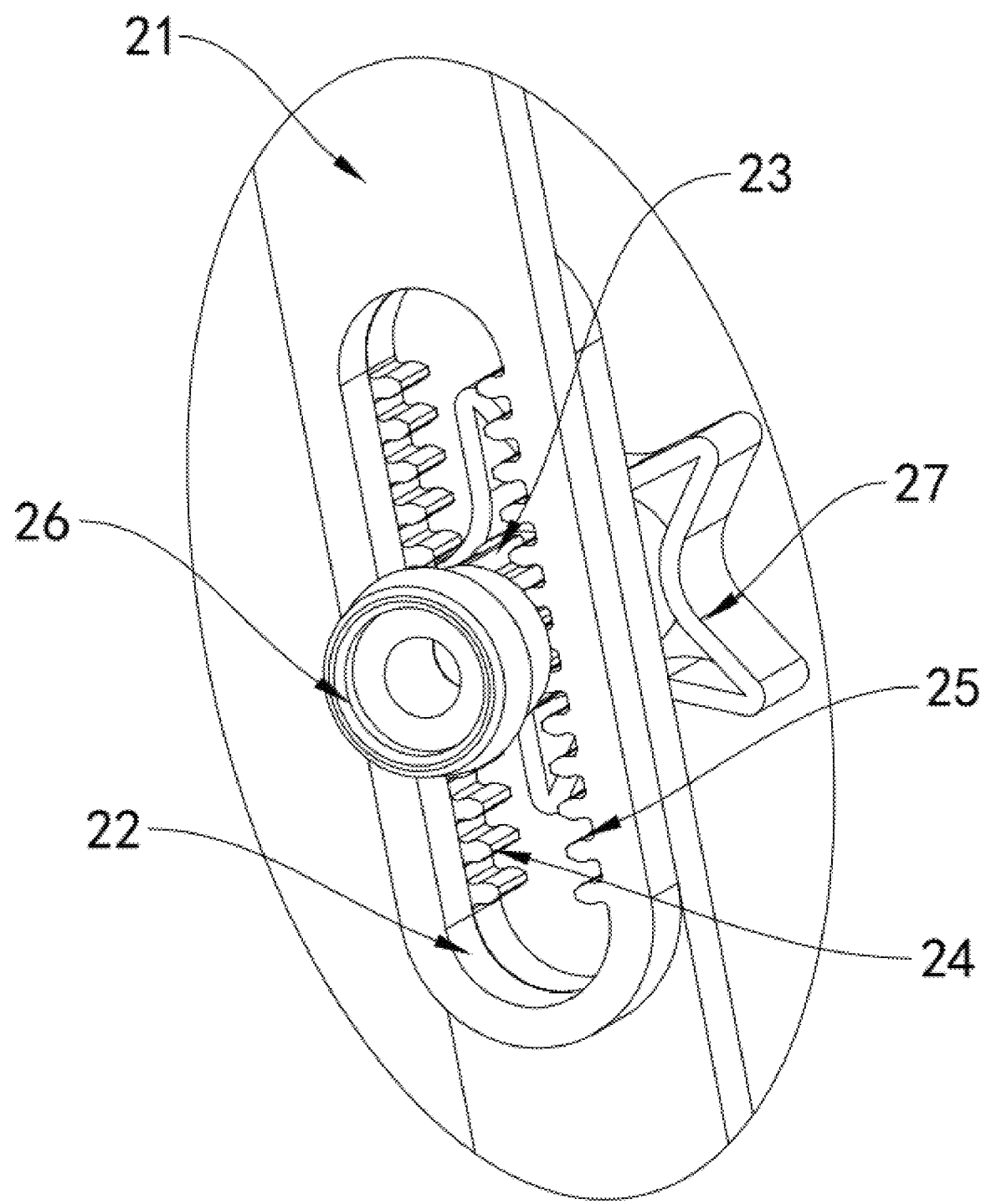
FIG. 4 is a schematic structural diagram of the movable hole in the beach cart according to the invention.
Figure 5:
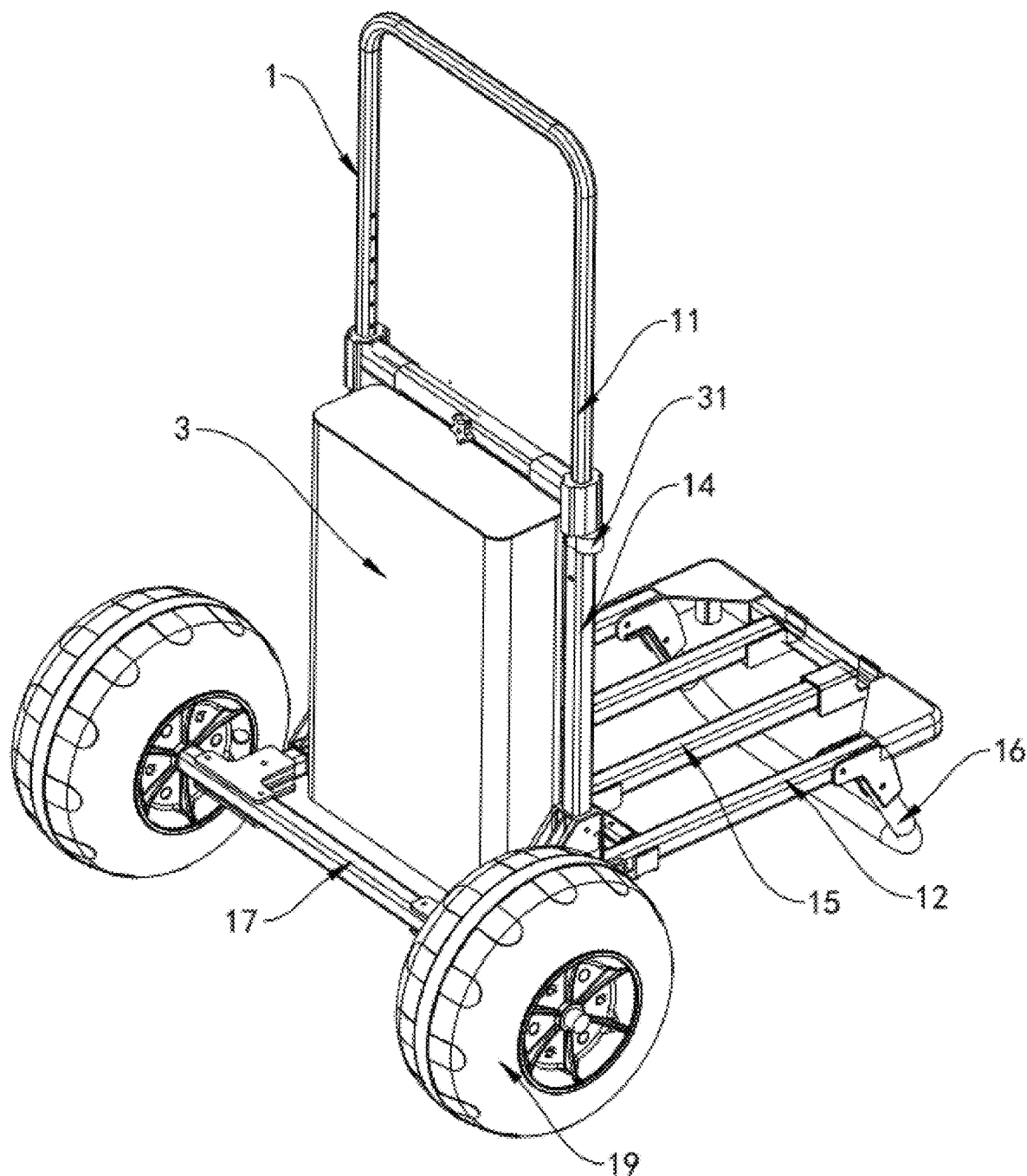
FIG. 5 is a schematic structural diagram of Embodiment 2 of the beach cart according to the invention.

In the embodiment, with reference to FIG. 3, the first gear rack 24 and the second gear rack 25 are respectively installed inside the two movable holes 22. The first gear rack 24 and the second gear rack 25 are not only staggered front and back, but also staggered up and down. The gear 23 is relatively long and can be simultaneously matched with the first gear rack 24 and the second gear rack 25.

Specifically, the first gear rack 24 and the second gear rack 25 are respectively meshed with a bottom and top of the gear 23; one end of the transmission handle 21 away from the movable hole 22 is provided with a stabilizing plate 211, and one side of the stabilizing plate 211 away from the transmission handle 21 is provided with an inserting rod 28; one end of the inserting rod 28 away from the stabilizing plate 211 is movably inserted into an interior of one of the locking holes 111, and one side of the stabilizing plate 211 away from the inserting rod 28 is provided with a support rib 212.

In the embodiment, the first gear rack 24 and the second gear rack 25 are staggered up and down. When the gear 23 rotates, the first gear rack 24 and the second gear rack 25 will move in opposite directions. When the first gear rack 24 and the second gear rack 25 move, they will drive the two transmission handles 21 to move. When the transmission handle 21 moves, it will drive the inserting rod 28 to move synchronously. When the inserting rod 28 is inserted into the locking hole 111, the position of the push rod 11 is locked; when the inserting rod 28 is out of the locking hole 111, the push rod 11 can be moved up and down to adjust the height. After the adjustment is completed, the locking hole 111 is made identical to the inserting rod 28. The locking handle 27 controls the gear 23 to rotate and drive the transmission handle 21 to drive the inserting rod 28 to be inserted into the locking hole 111 to complete the position locking. The stabilizing plate 211 is movably sleeved inside the cross bar 13. The setting of the stabilizing plate 211 ensures the movement stability of the transmission handle 21 and does not cause front and rear deviation. The setting of the support rib 212 ensures the connection stability between the stabilizing plate 211 and the transmission handle 21, and ensures the overall structural strength of the locking mechanism 2.

Specifically, both sides of the cross bar 13 are provided with assembly holes 132; one end of the gear 23 is provided with a positioning shaft 26 movably sleeved with one of the assembly holes 132, and the other end thereof passes through the other assembly hole 132 and is provided with a locking handle 27.

In the embodiment, after the positioning shaft 26 is sleeved with one of the assembly holes 132, the position of the gear 23 can be limited, avoiding the left and right deviation of the gear 23 and ensuring the stability of the gear 23 during rotation. The gear 23 is rotated by the locking handle 27 to drive the first gear rack 24 and the second gear rack 25. According to the rotation direction of the locking handle 27, the relative movement or the opposite movement of the two transmission handles 21 is realized. When the two transmission handles 21 move relative to each other, the transmission handle 21 drives the inserting rod 28 at one end thereof to disengage from the inside of the locking hole 111. When the two transmission handles 21 move away from each other, the transmission handle 21 drives the inserting rod 28 at one end thereof to be inserted into the inside of the locking hole 111.

Specifically, both ends of the support frame 16 are fixedly provided with L-shaped positioning joints 161; one end of the positioning joint 161 away from the support frame 16 is movably hinged to the load-bearing rod 12, and both sides of the positioning joint 161 are provided with a plurality of connecting ribs 1611.

In the embodiment, for the L-shaped positioning joint 161, when the load-bearing rod 12 needs to be placed horizontally, the support frame 16 is flipped so that the corner position of the L-shaped positioning joint 161 clamps the load-bearing rod 12, so that the support frame 16 can maintain a stable support for the load-bearing rod 12. When the load-bearing rod 12 does not need to be placed horizontally, but needs to be lowered and tilted, the support frame 16 is flipped so that the positioning joint 161 is disengaged from the clamping of the load-bearing rod 12, and the support frame 16 is flipped to be close to the bottom of the load-bearing rod 12, so that the horizontal height of the load-bearing rod 12 can be lowered, which facilitates loading and reduces the collision between the support frame 16 and ground obstacles during movement. The setting of the connecting ribs 1611 ensures the structural strength of the positioning joint 161 and the stability of its connection with the support frame 16.

Specifically, both ends of the load-bearing rod 12 are fixedly connected to the driving rod via a T-shaped first connecting piece 122, and the load-bearing rod 12 is U-shaped; both ends of one side of the load-bearing rod 12 away from the driving rod 17 are provided with triangular reinforcing support pieces 121; a top of the reinforcing support piece 121 is provided with a triangular support platform 1211.

In the embodiment, the first connecting piece 122 is fixed to the driving rod 17 and the load-bearing rod 12 by screws, which is convenient for assembly and disassembly. The triangular reinforcing support piece 121, together with the triangular support platform 1211, can increase the contact area between the load-bearing rod 12 and the goods, and better support the goods. The U-shaped load-bearing rod 12 has an integrated design with high strength and stability.

Specifically, both ends of the cross bar 13 are respectively connected to the two main body support tubes 14 via a T-shaped second connecting piece 131.

In the embodiment, the cross bar 13 is fixedly connected to the main support tube 14 through the second connecting piece 131, which ensures the stability of the cross bar 13. The interior of the main support tube 14 is round, which can reduce the friction with the push rod 11, making the push rod 11 smoother and more labor-saving when adjusted up and down.

Specifically, a bottom of the main body support tube 14 is connected to the load-bearing rod 12 via a triangular third connecting piece 141; an inclined surface on one side of the third connecting piece 141 is provided with a mounting groove 1411, and an inside of the mounting groove 1411 is provided with a reinforcing rib 1412.

In the embodiment, the main support tube 14 and the load-bearing rod 12 are perpendicular to each other. The triangular third connecting piece 141 can ensure the connection stability between the main support tube 14 and the load-bearing rod 12, and the third connecting piece 141 and the main support tube 14 and the load-bearing rod 12 are fixed together by screws, which can be disassembled and replaced later. The mounting groove 1411 is matched with the reinforcing rib 1412 to ensure the structural strength of the third connecting piece 141 and the connection stability between the main support tube 14 and the load-bearing rod 12.

Specifically, an inside of the load-bearing rod 12 is provided with a connecting rod 18; a plurality of reinforcing rods 15 are further provided between an inside of the load-bearing rod 12 and the connecting rod 18, and both ends of the reinforcing rod 15 are respectively connected to the load-bearing rod 12 and the connecting rod 18 via fourth connecting pieces 151;

one end of the fourth connecting piece 151 away from the reinforcing rod 15 is provided with a first L-shaped connecting piece 1511, and both ends of the reinforcing rod 15 are respectively connected to the load-bearing rod 12 and the connecting rod 18 via first L-shaped connecting pieces 1511;

both ends of the connecting rod 18 are connected to the load-bearing rod 12 via a fifth connecting piece 1811; one end of the fifth connecting piece 181 away from the connecting rod 18 is provided with a second L-shaped connecting piece 1811, and one end of the second L-shaped connecting piece 1811 away from the fifth connecting piece 181 is connected to the load-bearing rod 12.

In the embodiment, both ends of the reinforcing rod 15 are respectively fixed to the load-bearing rod 12 and the connecting rod 18 through a first L-shaped connecting piece 1511 by screws, and the end of the second L-shaped connecting piece 1811 away from the fifth connecting piece 181 is fixedly connected to the load-bearing rod 12 by screws. This design method facilitates the disassembly and assembly of the reinforcing rod 15 and the connecting rod 18. The reinforcing rod 15 is matched with the connecting rod 18 to increase the structural strength of the load-bearing rod 12, which can increase the area for supporting the goods, ensure the overall structural strength of the cart, and make it more stable to use.

Embodiment 2: with reference to FIGS. 1-5, the embodiment further comprises a luggage 3, and one side of the luggage 3 is provided with a clamping plate 31. The luggage 3 is installed between the two main body support tubes 14 through the clamping plate 31. This design further increases the carrying space of the cart body 1.

In summary, for the beach cart according to the invention, the push rod 11 can be unlocked and locked by turning the locking handle 27, making the adjustment process of the push rod 11 simpler and faster. The foldable support frame 16 facilitates the user to adjust the posture of the load-bearing rod 12, making loading more convenient, and the cart body 1 can also be used in conjunction with the luggage 3 to increase the carrying space and meet user needs.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A beach cart, comprising a cart body, wherein the cart body comprises a push rod and a load-bearing rod; both ends of the push rod are movably sleeved with a main body support tube; a cross bar is provided between the two main body support tubes, and an inside of the cross bar is provided with a locking mechanism for adjusting the height of the push rod and locking; the locking mechanism comprises two transmission handles and a gear for driving the two transmission handles to move relative to each other or in opposite directions;

tops of both ends of the load-bearing rod are respectively connected to bottoms of the two main body support tubes; a driving rod is provided at both ends of the load-bearing rod, and both ends of the driving rod are provided with a beach wheel; a bottom of one end of the load-bearing rod away from the driving rod is provided with a support frame;

insides of both transmission handles are provided with a movable hole sleeved with the gear; the two movable holes are opposite to each other, and insides of the two movable holes are respectively provided with a first gear rack and a second gear rack staggered from each other.

2. The beach cart of claim 1, wherein the push rod is U-shaped, and both sides of an inner wall of the push rod are provided with a plurality of locking holes; an inside of the beach wheel is provided with a wheel hub for connecting to the driving rod.

3. The beach cart of claim 1, wherein the first gear rack and the second gear rack are respectively meshed with a bottom and top of the gear; one end of the transmission handle away from the movable hole is provided with a stabilizing plate, and one side of the stabilizing plate away from the transmission handle is provided with an inserting rod; one end of the inserting rod away from the stabilizing plate is movably inserted into an interior of one of the locking holes, and one side of the stabilizing plate away from the inserting rod is provided with a support rib.

4. The beach cart of claim 1, wherein both sides of the cross bar are provided with assembly holes; one end of the gear is provided with a positioning shaft movably sleeved with one of the assembly holes, and the other end thereof passes through the other assembly hole and is provided with a locking handle.

5. The beach cart of claim 1, wherein both ends of the support frame are fixedly provided with L-shaped positioning joints; one end of the positioning joint away from the support frame is movably hinged to the load-bearing rod, and both sides of the positioning joint are provided with a plurality of connecting ribs.

6. The beach cart of claim 1, wherein both ends of the load-bearing rod are fixedly connected to the driving rod via a T-shaped first connecting piece, and the load-bearing rod is U-shaped; both ends of one side of the load-bearing rod away from the driving rod are provided with triangular reinforcing support pieces; a top of the reinforcing support piece is provided with a triangular support platform.

7. The beach cart of claim 1, wherein both ends of the cross bar are respectively connected to the two main body support tubes via a T-shaped second connecting piece.

8. The beach cart of claim 1, wherein a bottom of the main body support tube is connected to the load-bearing rod via a triangular third connecting piece; an inclined surface on one side of the third connecting piece is provided with a mounting groove, and an inside of the mounting groove is provided with a reinforcing rib.

9. The beach cart of claim 1, wherein an inside of the load-bearing rod is provided with a connecting rod; a plurality of reinforcing rods are further provided between an inside of the load-bearing rod and the connecting rod, and both ends of the reinforcing rod are respectively connected to the load-bearing rod and the connecting rod via fourth connecting pieces;

one end of the fourth connecting piece away from the reinforcing rod is provided with a first L-shaped connecting piece, and both ends of the reinforcing rod are respectively connected to the load-bearing rod and the connecting rod via first L-shaped connecting pieces;

both ends of the connecting rod are connected to the load-bearing rod via a fifth connecting piece; one end of the fifth connecting piece away from the connecting rod is provided with a second L-shaped connecting piece, and one end of the second L-shaped connecting piece away from the fifth connecting piece is connected to the load-bearing rod.

* * * * *